(12) United States Patent
Noichi et al.

(10) Patent No.: US 11,875,759 B2
(45) Date of Patent: Jan. 16, 2024

(54) DISPLAY DEVICE AND CONTROL METHOD FOR DISPLAY DEVICE

(71) Applicant: Japan Display Inc., Tokyo (JP)

(72) Inventors: Shunsuke Noichi, Tokyo (JP); Takayuki Imai, Tokyo (JP)

(73) Assignee: Japan Display Inc., Tokyo (JP)

( * ) Notice: Subject to any disclaimer, the term of this patent is extended or adjusted under 35 U.S.C. 154(b) by 324 days.

(21) Appl. No.: 17/336,670

(22) Filed: Jun. 2, 2021

(65) Prior Publication Data

US 2021/0287623 A1 Sep. 16, 2021

Related U.S. Application Data (63) Continuation of application No. PCT/JP2019/043306, filed on Nov. 5, 2019.

(30) Foreign Application Priority Data

Dec. 3, 2018 (JP) ................................. 2018-226612

(51) Int. Cl.
*G09G 3/36* (2006.01)

(52) U.S. Cl.
CPC ... *G09G 3/3696* (2013.01); *G09G 2300/0426* (2013.01); *G09G 2300/0452* (2013.01); *G09G 2310/0202* (2013.01)

(58) Field of Classification Search
CPC ......... G09G 3/3696; G09G 2300/0426; G09G 2300/0452; G09G 2310/0202
See application file for complete search history.

(56) References Cited

U.S. PATENT DOCUMENTS

| 2007/0152945 | A1  | 7/2007 | Park et al. |
| 2016/0231497 | A1* | 8/2016 | Kato ................... G09G 3/3406 |
| 2018/0024403 | A1  | 1/2018 | Yata et al. |
| 2018/0211611 | A1  | 7/2018 | Kato |
| 2019/0033663 | A1  | 1/2019 | Yata et al. |

FOREIGN PATENT DOCUMENTS

| JP | 2007-183545 A | 7/2007 |
| JP | 2017-76002 A  | 4/2017 |
| JP | 2018-13714 A  | 1/2018 |
| JP | 2018-120021 A | 8/2018 |

OTHER PUBLICATIONS

Office Action dated Oct. 18, 2022, in corresponding Japanese Patent Application No. 2018-226612; 6 pages.
International Search Report dated Feb. 4, 2020 in PCT/JP2019/043306, filed on Nov. 5, 2019, 2 pages.

* cited by examiner

*Primary Examiner* — Nathanael R Briggs
(74) *Attorney, Agent, or Firm* — Maier & Maier, PLLC (57) ABSTRACT

According to one embodiment, a display device includes a display panel including pixels arranged in a matrix, a common electrode, a pixel electrode disposed for each of the pixels, and a liquid crystal layer containing a polymer and liquid crystal molecules, a light source, and a controller controlling a voltage between the common electrode and the pixel electrode, and controlling an operation of the light source. The controller applies a voltage corresponding to an image component to write the image component between the common electrode and the pixel electrode in order from the pixel located on an opposite side to the light source in a first period, and turns on the light source to display an image corresponding to the written image component on the display panel in the first period.

12 Claims, 7 Drawing Sheets

DISPLAY DEVICE AND CONTROL METHOD FOR DISPLAY DEVICE

CROSS-REFERENCE TO RELATED APPLICATIONS

This application is a Continuation Application of PCT Application No. PCT/JP2019/043306, filed Nov. 5 2019 and based upon and claiming the benefit of priority from Japanese Patent Application No. 2018-226612, filed Dec. 3, 2018, the entire contents of all of which are incorporated herein by reference.

FIELD

Embodiments described herein relate generally to a display device and a control method for the display device.

BACKGROUND

Recently, a display device comprising a light source, a pair of substrates including a pixel electrode and a common electrode, and a polymer dispersed liquid crystal layer disposed between these substrates has been known. For example, the polymer dispersed liquid crystal layer contains a streak-like polymer and liquid crystal molecules.

In the polymer dispersed liquid crystal layer, it is possible to control the inclination of the optical axis of the liquid crystal molecule with respect to the optical axis of the polymer by rotating the liquid crystal molecule by an electric field between the pixel electrode and the common electrode. According to this, it is possible to control the degree of scattering of light from the light source for each pixel and display an arbitrary image on the display device.

In the display device comprising the polymer dispersed liquid crystal layer, a further improvement of display quality is required.

DETAILED DESCRIPTION

In general, according to one embodiment, there is provided a display device comprising: a display panel comprising a plurality of pixels arranged in a matrix, a common electrode, a pixel electrode disposed for each of the pixels, and a liquid crystal layer containing a polymer and liquid crystal molecules; a light source emitting light to the display panel; and a controller controlling a voltage between the common electrode and the pixel electrode, and controlling an operation of the light source. The controller applies a voltage corresponding to an image component to write the image component between the common electrode and the pixel electrode in order from the pixel located on an opposite side to the light source in a first period, and turns on the light source to display an image corresponding to the written image component on the display panel in the first period.

According to another embodiment, there is provided a control method for a display device, the display device comprising a display panel including a plurality of pixels arranged in a matrix, a common electrode, a pixel electrode disposed for each of the pixels, and a liquid crystal layer containing a polymer and liquid crystal molecules, a light source emitting light to the display panel, and a controller controlling a voltage between the common electrode and the pixel electrode and controlling an operation of the light source, the control method comprising: applying a voltage corresponding to an image component to write the image component between the common electrode and the pixel electrode in order from the pixel located on an opposite side to the light source in a first period; and turning on the light source to display an image corresponding to the written image component on the display panel in the first period.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In addition, in the specification and drawings, components which function in the same or a similar manner to those described in connection with preceding drawings are denoted by the same reference numbers, and detailed descriptions thereof which are considered redundant are omitted unless necessary.

As an example of the display device, a display device employing a polymer dispersed liquid crystal will be described below. The display device of the present embodiment can be used for various devices such as smartphones, tablet computers and mobile telephone terminals.

Figure 1:
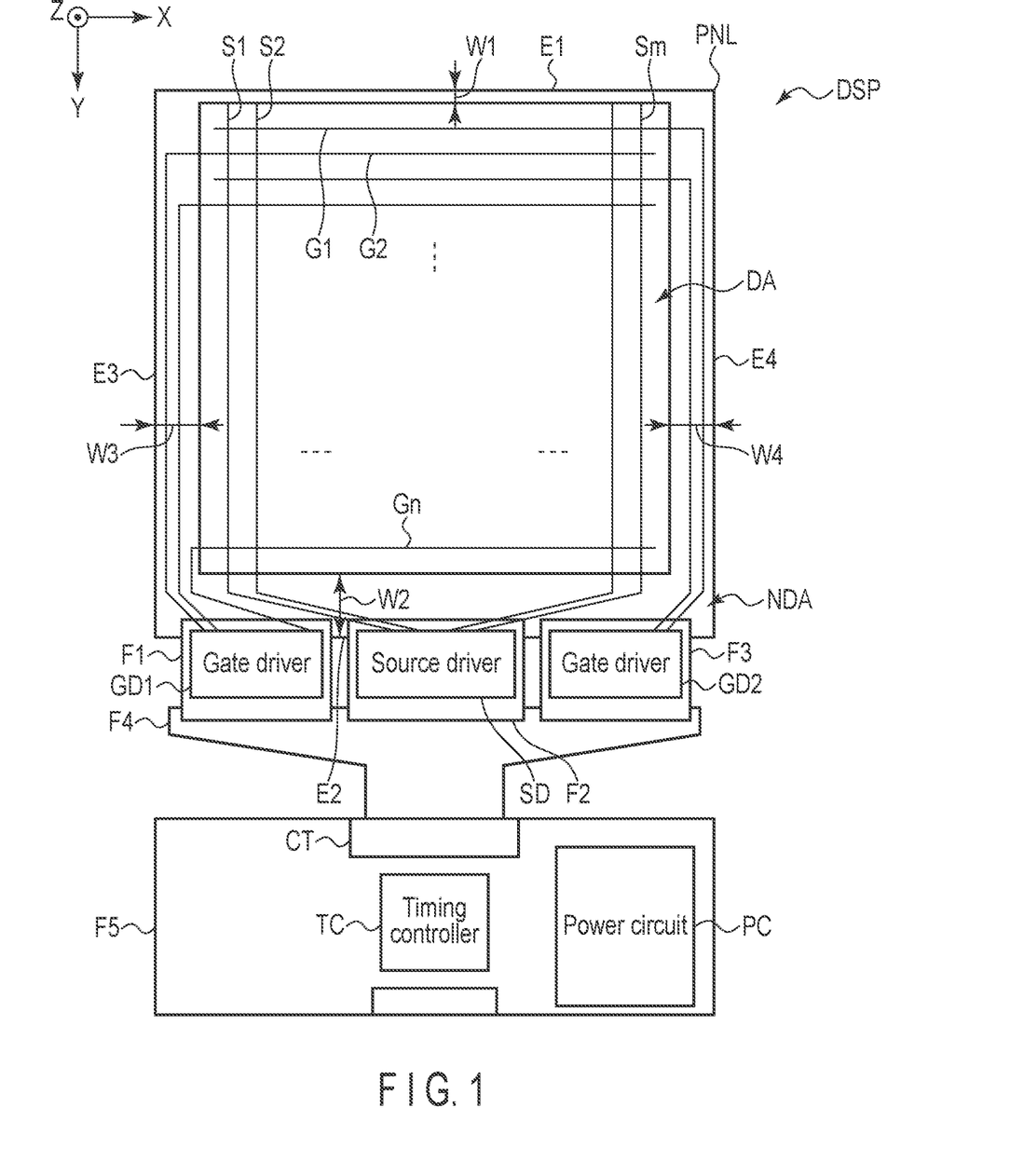
FIG. 1 is a plan view showing a configuration example of a display device according to one embodiment.

FIG. 1 is a plan view showing a configuration example of a display device DSP according to the present embodiment. In the drawing, a first direction X and a second direction Y are directions intersecting each other, and a third direction Z is a direction intersecting the first direction X and the second direction Y. In one example, the first direction X, the second direction Y and the third direction Z are orthogonal to one another. However, they may intersect one another at an angle other than 90 degrees.

The display device DSP comprises a display panel PNL, wiring boards F1 to F5 and the like. The display panel PNL comprises a display area DA in which an image is displayed, and a frame-like non-display area NDA which surrounds the display area DA. The display area DA comprises n scanning lines G (G1 to Gn), m signal lines S (S1 to Sm) and the like. Note that n and m each are a positive integer, and n and m may be equal to each other or n and m may be different from each other. The scanning lines G each extend in the first direction X, and are arranged at intervals in the second direction Y. The signal lines S each extend in the second direction Y, and are arranged at intervals in the first direction X.

The display panel PNL has end portions E1 and E2 along the first direction X, and end portions E3 and E4 along the second direction Y. As for the width of the non-display area NDA, a width W1 along the second direction Y between the end portion E1 and the display area DA is less than a width W2 along the second direction Y between the end portion E2 and the display area DA. In addition, a width W3 along the first direction X between the end portion E3 and the display area DA is equal to a width W4 along the first direction X between the end portion E4 and the display area DA. Furthermore, the widths W3 and W4 each are less than the width W2. Note that the widths W3 and W4 each may be equal to the width W1 or may be different from the width W1.

The wiring boards F1 to F3 are arranged in this order in the first direction X. The wiring board F1 comprises a gate driver GD1. The wiring board F2 comprises a source driver SD. The wiring board F3 comprises a gate driver GD2. The wiring boards F1 to F3 each are connected to the display panel PNL and the wiring board F4. The wiring board F5 comprises a timing controller TC, a power circuit PC and the like. The wiring board F4 is connected to a connector CT of the wiring board F5. Note that the wiring boards F1 to F3 may be replaced with a single wiring board. In addition, the wiring boards F1 to F4 may be replaced with a single wiring board.

In the illustrated example, the odd-numbered scanning lines from the end portion E1 side are connected to the gate driver GD2, and the even-numbered scanning lines are connected to the gate driver GD1. However, the connection relationship between the gate drivers GD1 and GD2 and each scanning line is not limited to the illustrated example.

Figure 2:
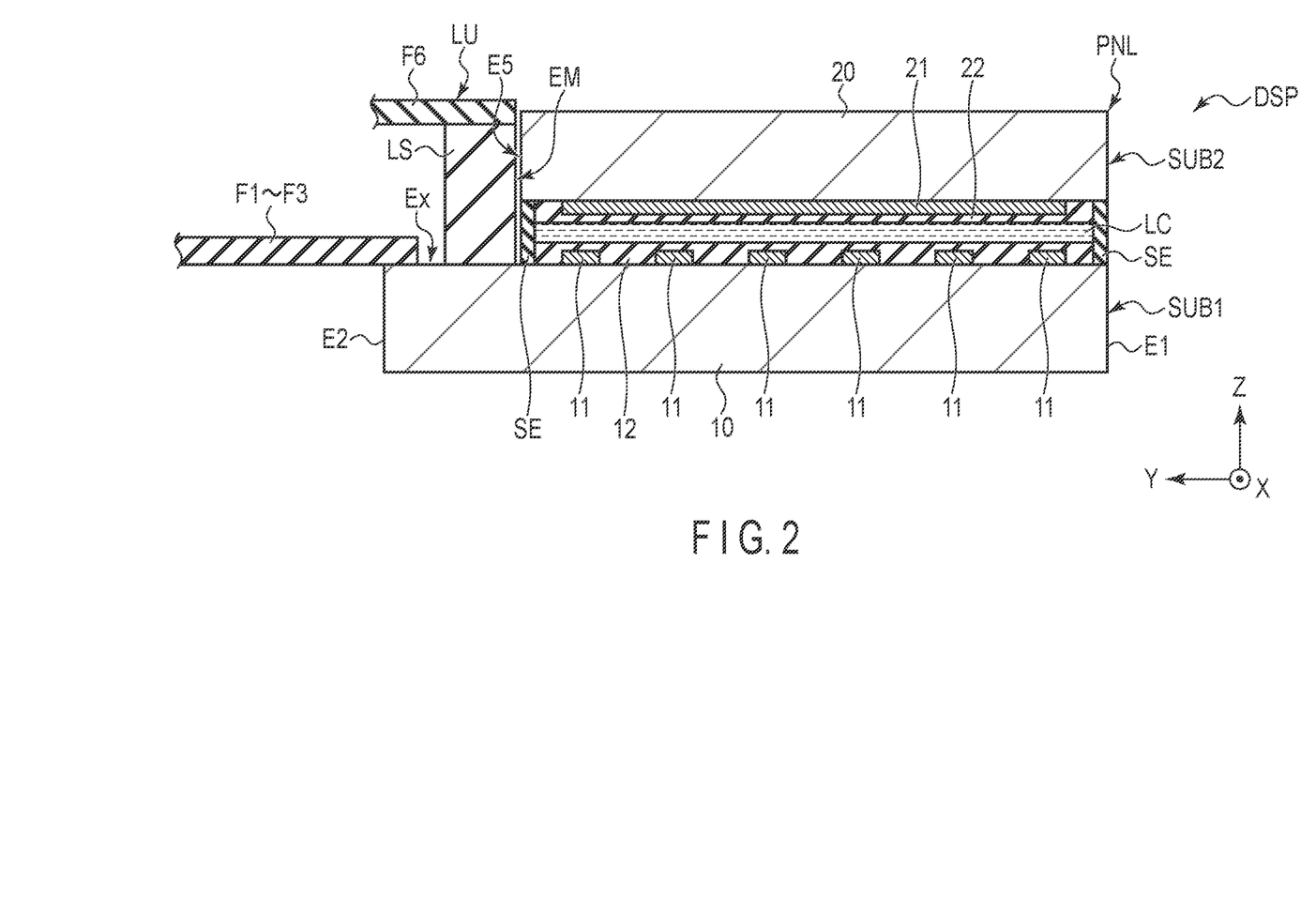
FIG. 2 is a cross-sectional view of the display device shown in FIG. 1.

FIG. 2 is a cross-sectional view of the display device DSP shown in FIG. 1. In s cross section of the display device DSP in a Y-Z plane defined by the second direction Y and the third direction Z, only the main part thereof will be described here.

The display panel PNL comprises a first substrate SUB1, a second substrate SUB2, a liquid crystal layer LC and the like. The first substrate SUB1 comprises a transparent substrate 10, a pixel electrode 11, an alignment film 12 and the like. The second substrate SUB2 comprises a transparent substrate 20, a common electrode 21, an alignment film 22 and the like. The pixel electrode 11 and the common electrode 21 each are formed of a transparent conductive material such as indium tin oxide (ITO) or indium zinc oxide (IZO). The liquid crystal layer LC contains a polymer dispersed liquid crystal, and is located between the alignment film 12 and the alignment film 22. The first substrate SUB1 and the second substrate SUB2 are bonded together by a sealant SE. The first substrate SUB1 has an extension portion EX extending in the second direction Y from an end portion E5 of the transparent substrate 20.

The wiring boards F1 to F3 are connected to the extension portion EX of the first substrate SUB1.

A light source unit LU comprises a light-emitting element LS, a wiring board F6 and the like. The light-emitting element LS is connected to the wiring board F6, and is located on the extension portion EX. The light-emitting element LS has a light-emitting portion EM opposed to the end portion E5. Illumination light emitted from the light-emitting portion EM enters from the end portion E5, and propagates through the display panel PNL.

Figure 3:
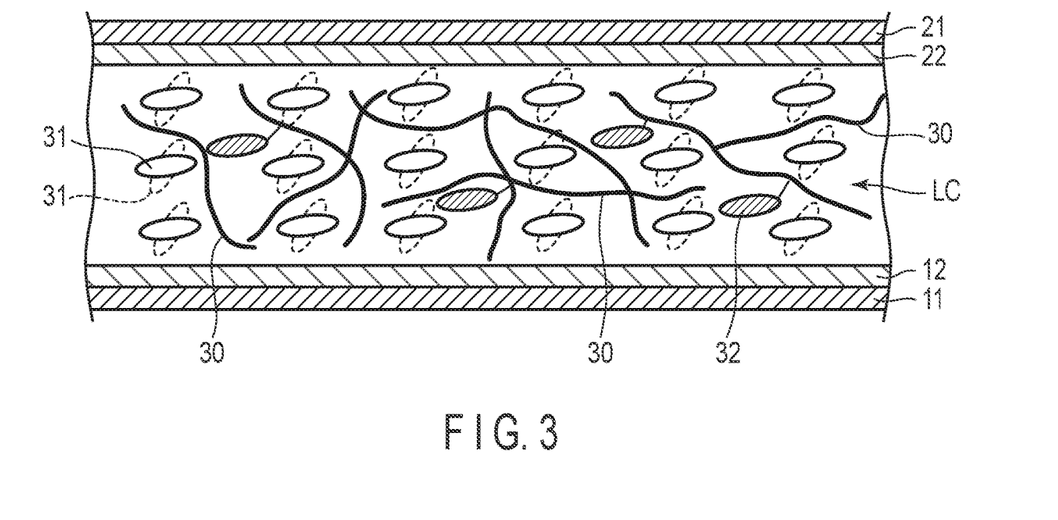
FIG. 3 is a schematic cross-sectional view for explaining the configuration of a liquid crystal layer in the display device shown in FIG. 1.

FIG. 3 is a schematic cross-sectional view of the display panel PNL for explaining a configuration example of the liquid crystal layer LC. In the present embodiment, the liquid crystal layer LC has a streak-like (network-like) polymer 30 and liquid crystal molecules 31. In one example, the polymer 30 is a liquid crystal polymer. The liquid crystal molecules 31 are dispersed in the gaps of the polymer 30. As shown in FIG. 3, there may be a monomer 32 connected to the polymer 30.

This liquid crystal layer LC is obtained by, for example, injecting a liquid crystal monomer between the alignment film 12 and the alignment film 22 and irradiating the liquid crystal monomer aligned in a predetermined direction by the alignment regulating force of the alignment films 12 and 22 with ultraviolet light. That is, the liquid crystal monomer is polymerized by ultraviolet light to form the streak-like polymer 30.

The polymer 30 and the liquid crystal molecule 31 each have optical anisotropy or refractive anisotropy. The responsiveness to an electric field of the polymer 30 is lower than the responsiveness to an electric field of the liquid crystal molecule 31. For example, the alignment direction of the polymer 30 hardly changes regardless of an electric field between the pixel electrode 11 and the common electrode 21. On the other hand, the alignment direction of the liquid crystal molecule 31 changes according to the electric field.

In FIG. 3, the liquid crystal molecule 31 shown by a solid line represents an alignment state when there is no potential difference between the pixel electrode 11 and the common electrode 21 (no electric field is formed). The liquid crystal molecule 31 shown by a dashed line represents an alignment state when there is a potential difference between the pixel electrode 11 and the common electrode 21 (an electric field is formed).

In a state where no electric field acts on the liquid crystal layer LC or the electric field is extremely weak, the optical axis of the polymer 30 and the optical axis of the liquid crystal molecule 31 are substantially parallel to each other. Therefore, light entering the liquid crystal layer LC is transmitted almost without being scattered in the liquid crystal layer LC. This state is hereinafter referred to as a transparent state. In addition, the voltage of the pixel electrode 11 for realizing the transparent state is referred to as a transparent voltage. The transparent voltage may be the same as a common voltage applied to the common electrode 21 or may be a voltage slightly different from the common voltage.

On the other hand, in a state where a sufficient electric field acts on the liquid crystal layer LC, the optical axis of the polymer 30 and the optical axis of the liquid crystal molecule 31 intersect each other. Therefore, light entering the liquid crystal layer LC is scattered in the liquid crystal layer LC. This state is hereinafter referred to as a scattering state. In addition, the voltage of the pixel electrode 11 for realizing the scattering state is referred to as a scattering voltage. The scattering voltage is a voltage that the potential difference between the pixel electrode 11 and the common electrode 21 becomes larger than that of the transparent voltage, and in the present embodiment, voltages corresponding to red, green and blue image components which will be described later correspond to this.

Figure 4:
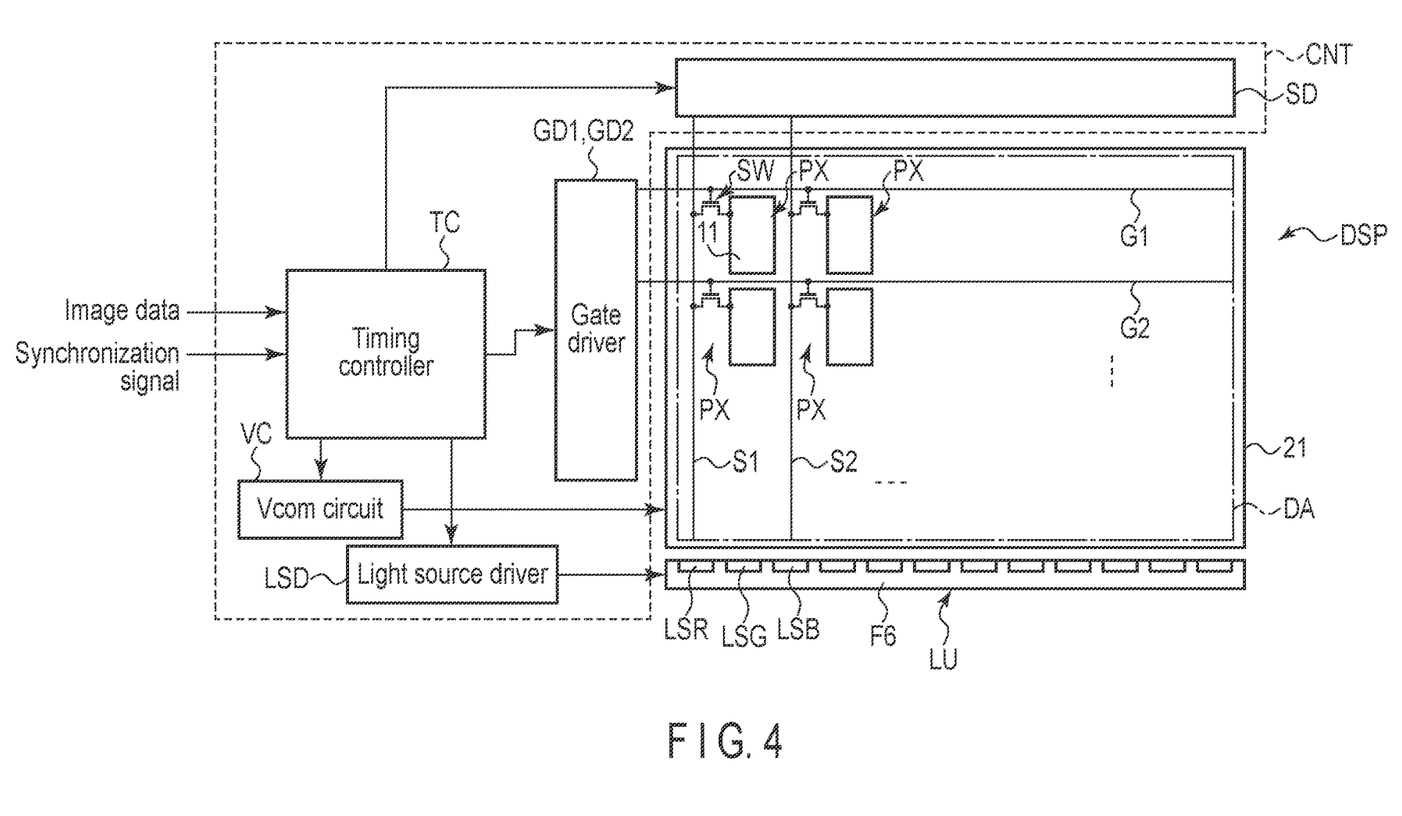
FIG. 4 is an illustration showing the main components of the display device shown in FIG. 1.

FIG. 4 is an illustration showing the main components of the display device DSP shown in FIG. 1.

The display device DSP comprises a controller CNT shown by a dotted line in the drawing. The controller CNT includes the timing controller TC, the gate drivers GD1 and GD2, the source driver SD, a Vcom circuit VC, a light source driver LSD and the like.

The timing controller TC generates various signals based on image data, a synchronization signal and the like input from the outside. In one example, the timing controller TC outputs an image component (image signal) generated by predetermined signal processing to the source driver SD based on the image data. In addition, the timing controller TC outputs control signals generated based on the synchronization signal to the gate drivers GD1 and GD2, the source driver SD, the Vcom circuit VC and the light source driver LSD, respectively.

The display area DA shown by a dashed-dotted line in the drawing comprises a plurality of pixels PX. Each pixel PX comprises a switching element SW and the pixel electrode 11. The switching element SW is electrically connected to the scanning line G and the signal line S. The pixel electrode 11 is connected to the signal line S via the switching element SW. The common electrode 21 is opposed to the pixel electrodes 11. A scanning signal is supplied from the gate driver GD1 or GD2 to each scanning line G. An image component is supplied from the source driver SD to each signal line S. A common voltage is supplied from the Vcom circuit VC to the common electrode 21. The image component supplied to the signal line S is supplied to the pixel electrode 11 connected to the switching element SW in a period in which the switching element SW becomes conductive based on the scanning signal supplied to the scanning line G.

In the following description, the supply of an image component to the pixel electrode 11 to form a potential difference between the pixel electrode 11 and the common electrode 21 may be described as writing of an image component (a voltage correspond to an image component) to the pixel PX comprising the pixel electrode 11. In addition, in the following description, the setting of the voltage of the pixel electrode 11 to the transparent voltage to transition from the scattering state to the transparent state may be described as erasing of an image component written in the pixel PX comprising the pixel electrode 11.

In the example of FIG. 4, the common electrode 21 disposed over the entire display area DA is illustrated. However, a plurality of common electrodes 21 divided by at least one pixel PX may be disposed in the display area DA, each common electrode 21 may be connected to a common line, and the common voltage may be supplied from the Vcom circuit VC to each common electrode 21 via the common line.

The light source unit LU comprises a light-emitting element LSR which emits red light, a light-emitting element LSG which emits green light, and a light-emitting element LSB which emits blue light as the light-emitting element LS. As the light-emitting elements LSR, LSG and LSB, a light-emitting diode can be used, for example. However, the present invention is not limited to this example. The light source driver LSD controls the lighting periods of the light-emitting elements LSR, LSG and LSB based on the control signal from the timing controller TC. As will be described later, in a drive method (field-sequential method) in which one frame period has a plurality of fields (referred to also as sub-frames), one of three light-emitting elements LSR, LSG and LSB is turned on in each field, and the color of illumination light is switched each field.

Figure 5:
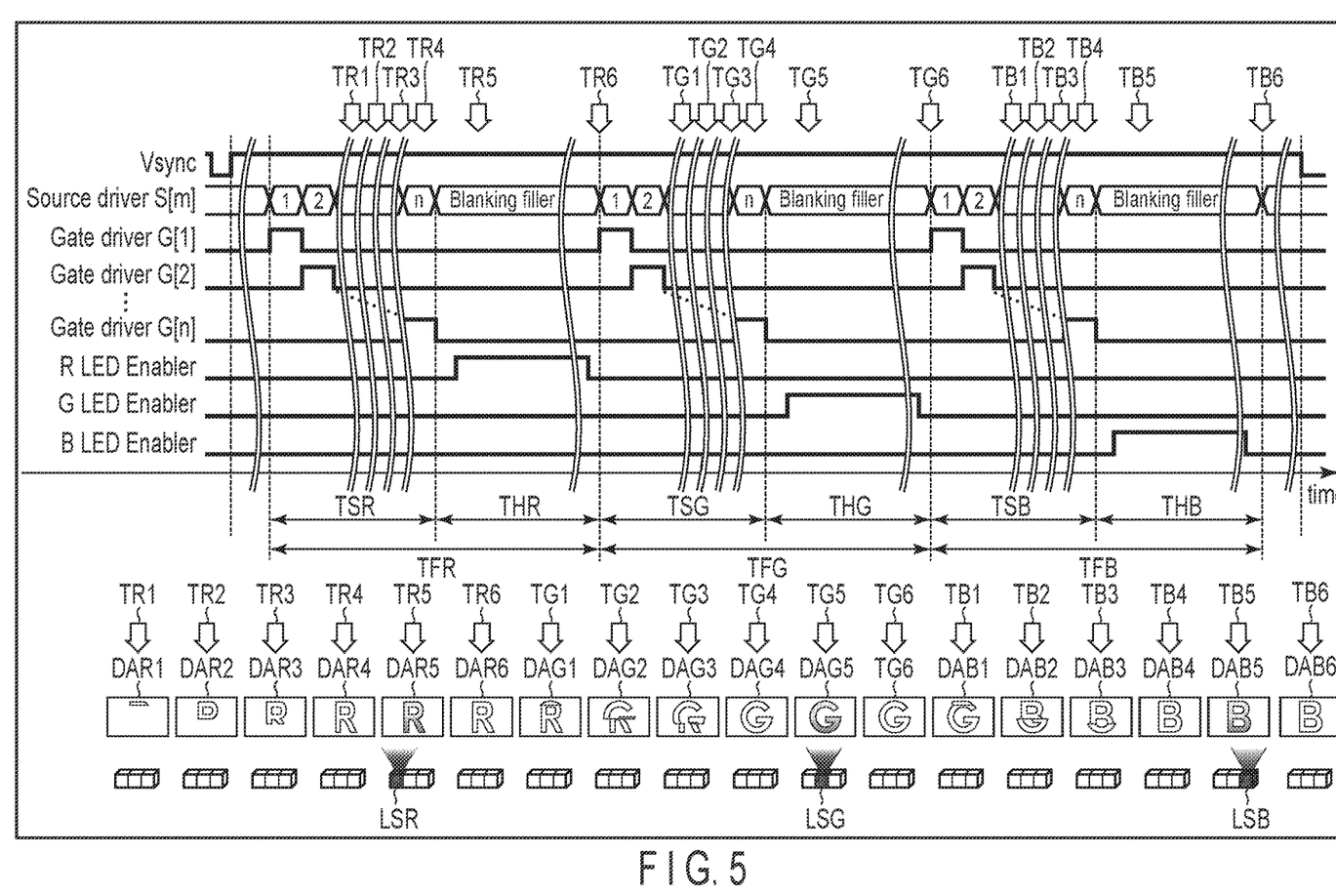
FIG. 5 is a timing chart for explaining a general display operation of the display device shown in FIG. 1.

FIG. 5 is a timing chart showing an example of a general display operation in the display device DSP. At the start of one frame, a vertical synchronization signal Vsync falls. That is, in the example of FIG. 5, the time from when the vertical synchronization signal Vsync falls to when it falls again corresponds to a frame period F. When the display device DSP is driven at, for example, 60 Hz, one frame period is about 16.7 ms.

The frame period F includes a red field period TFR in which a red image is displayed in the display area DA, a green field period TFG in which a green image is displayed in the display area DA, and a blue field period TFB in which a blue image is displayed in the display area DA. Note that, although FIG. 5 illustrates a case where these three field periods are arranged in the order of red field period TFR, green field period TFG and blue field period TFB, these three field periods may be arranged in a different order.

The red field period TFR includes a scanning period TSR and a holding period THR. The holding period THR may be referred to also as a blanking period. The scanning period TSR includes n horizontal scanning periods THSR1 to THSRn. The horizontal scanning period THSR may be referred to as a horizontal period. In the scanning period TSR, the gate driver GD1 and the gate driver GD2 supply the scanning signal to the scanning lines G1 to Gn sequentially. Furthermore, during the supply of the scanning signal, the source driver SD supplies a voltage (scattering voltage) corresponding to a red image component to the signal lines S1 to Sm. More specifically, a voltage of a grayscale corresponding to each pixel PX of a line to which the scanning signal is supplied is supplied to the signal lines S1 to Sm simultaneously, and this operation is repeated.

By this operation, the voltage corresponding to the red image component is written between the pixel electrode 11 and the common electrode 21 of each pixel PX. The time required for writing the voltage corresponding to the red image component to all the pixels PX, that is, the scanning period TSR is, for example, 2.5 ms. The holding period THR is a period from the completion of the writing of the red image component to all the pixels PX to the arrival of the green field period TFG and is, for example, 2.5 ms. In this holding period THR, the red light-emitting element LSR is turned on. The holding period THR and the lighting period of the red light-emitting element LSR may be the same as each other or may be different from each other. In the holding period THR, the red light-emitting element LSR is turned on so that a red image is displayed in the display area DA.

The operation in the green field period TFG and the operation in the blue field period TFG are the same as that in the red field period TFR. That is, the green field period TFG includes a scanning period TSG and a holding period THG, a voltage (scattering voltage) corresponding to a green image component is written to each pixel PX in the scanning period TSG, and the green light-emitting element LSG is turned on in the holding period THG. According to this, a green image is displayed in the display area DA. In addition, the blue field period TFB includes a scanning period TSB and a holding period THB, and a voltage (scattering voltage) corresponding to a blue image component is written to each pixel PX in the scanning period TSB, and the blue light-emitting element LSB is turned on in the holding period THB. According to this, a blue image is displayed in the display area DA.

DAR1 to DAR4 of FIG. 5 schematically show the state of display area DA in times TR1 to TR4 included in the scanning period TSR, and a state where the voltage corresponding to the red image component is written in order from the pixel PX located on the opposite side to the light-emitting element LS (in other words, a state where the voltage corresponding to the red image component is written in order from the pixel PX located far from the light-emitting element LS). DAR5 of FIG. 5 schematically shows the state of the display area DA in a time TR5 included in the holding period THR, and shows a state where the red light-emitting element LSR is turned on and the red image is displayed. DAR6 of FIG. 5 schematically shows the state of the display area DA in a time TR6 of transition from the red field period TFR to the green field period TFG, and shows a state where the red light-emitting element LSR is turned off and the voltage corresponding to the red image component remains in each pixel PX.

Similarly, DAG1 to DAG4 of FIG. 5 schematically shows the state of the display area DA in times TG1 to TG4 included in the scanning period TSG, and shows a state where the voltage corresponding to the green image component is written in order from the pixel PX located on the opposite side to the light-emitting element LS in place of the voltage corresponding to the red image component (in order words, a state where the voltage corresponding to the red image component is overwritten with the voltage corresponding to the green image component). If the light-emitting element LS is turned on in the middle of overwriting with the green image component, the red image component before overwriting or the green image component after overwriting is displayed in a different color from the original, and color mixing occurs. Therefore, the light-emitting element LS is turned off in DAG1 to DAG4 of FIG. 5. DAG5 of FIG. 5 schematically shows the state of the display area DA in a time TG5 included in the holding period THG, and shows a state where the green light-emitting element LSG is turned on and the green image is displayed. DAG6 of FIG. 5 schematically shows the state of the display area DA in a time TG6 of transition from the green field period TFG to the blue field period TFB, and shows a state where the green light-emitting element LSG is turned off and the voltage corresponding to the green image component remains in each pixel PX.

Furthermore, DAB1 to DAB4 of FIG. 5 schematically show the state of the display area DA in times TB1 to TB4 included in the scanning period TSB, and shows a state where the voltage corresponding to the blue image component is written in order from the pixel PX located on the opposite side to the light-emitting element LS in place of the voltage corresponding to the green image component. If the light-emitting element LS is turned on in the middle of overwriting with the blue image component, the green image component before overwriting or the blue image component after overwriting is displayed in a different color from the original, and color mixing occurs. Therefore, the light-emitting element LS is turned off in DAB1 to DAB4 of FIG. 5. DAB5 of FIG. 5 schematically shows the state of the display area DA in a time TB5 included in the holding period THB, and shows a state where the blue light-emitting element LSB is turned on and the blue image is displayed. DAB6 of FIG. 5 schematically shows the state of the display area DA in a time TB6 of transition from the blue field period TFB to the red field period TFR included in the next frame, and shows a state where the blue light-emitting element LSB is turned off and the voltage corresponding to the blue image component remains in each pixel PX.

The red, green and blue image components displayed by time-division in the frame period F are mixed together so that the display image is viewed as a multicolor display image by the user.

In a general display operation of the display device DSP, as described with reference to FIG. 5, after a voltage corresponding to each color component is written to each pixel PX, a light-emitting element LS of the corresponding color is turned on, and an image of the corresponding color component is displayed in the display area DA. However, this display operation causes the following inconvenience.

In general, the intensity of light emitted from a light source has a characteristic of attenuation with the increase of the distance from the light source. That is, the intensity of illumination light emitted from the light-emitting element LS is also attenuated as the distance from the light-emitting element LS increases. As shown in FIG. 4, the light-emitting element LS is disposed at the lower end of the display panel PNL, and emits illumination light from the lower end of the panel. Therefore, light attenuated significantly as compared with that at the time of emission propagates at a position far from the light-emitting element LS, and light having a substantially equal intensity to that at the time of emission propagates at a position close to the light-emitting element LS. According to this, as shown in DAR5, DAG5 and DAB5 of FIG. 5, a darker image is displayed toward the upper end (in other words, the opposite side to the light-emitting element LS) and a brighter image is displayed toward the lower end (in other words, the light-emitting element LS side) in the display area DA. That is, there is an inconvenience that a luminance gradient occurs in the same display plane and display quality deteriorates. The display operation of the display device which eliminates this inconvenience will be described below.

Figure 6:
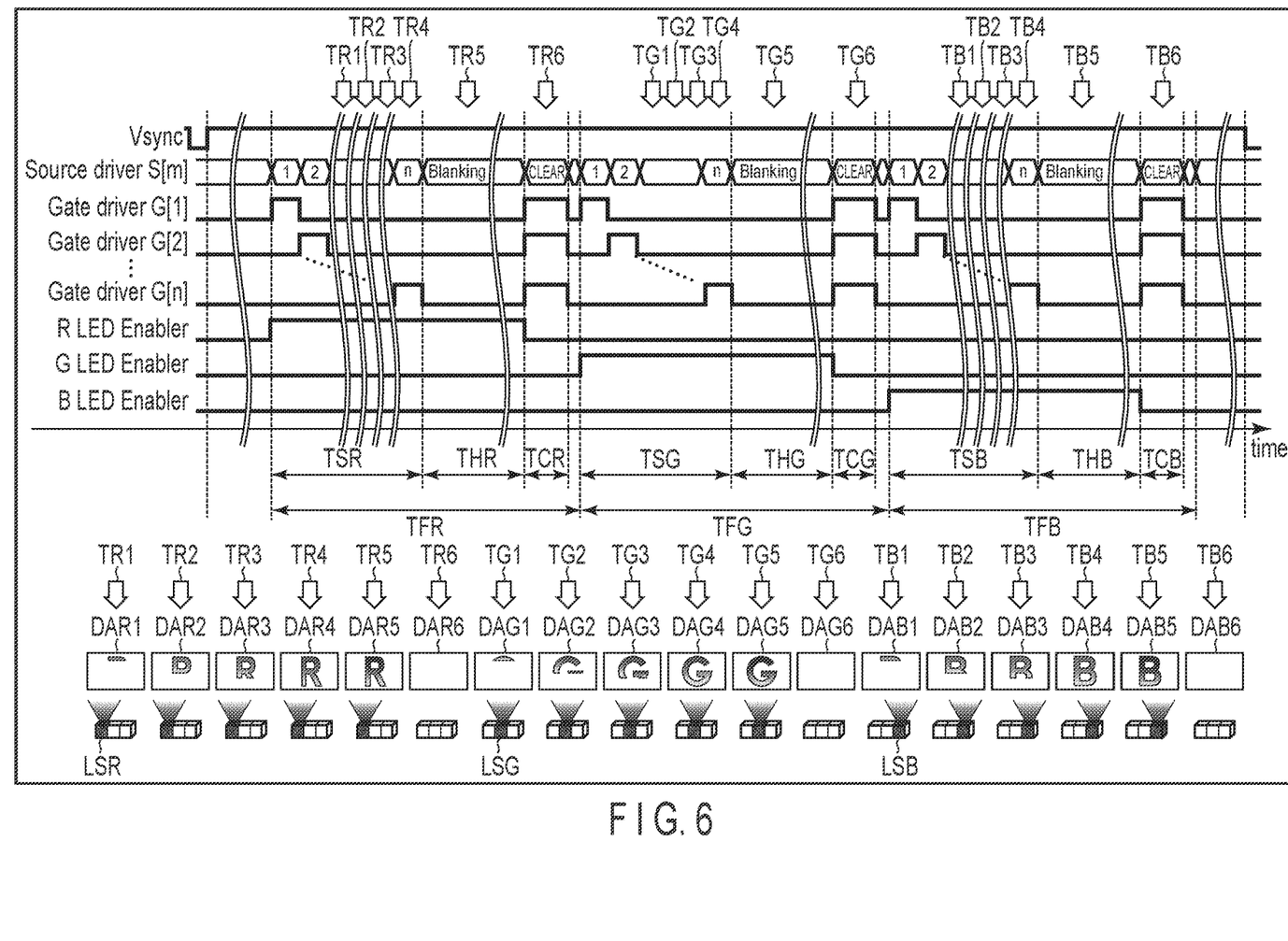
FIG. 6 is a timing chart for explaining the display operation of the present embodiment of the display device shown in FIG. 1.

FIG. 6 is a timing chart showing an example of the display operation of the present embodiment in the display device DSP.

At the start of one frame, just like the display operation shown in FIG. 5, a vertical synchronization signal Vsync falls. That is, also in the display operation of the present embodiment, the period from when the vertical synchronization signal Vsync falls to when it falls again corresponds to a frame period F, which is the same as the display operation of FIG. 5.

The frame period F includes a red field period TFR, a green field period TFG and a blue field period TFB. Note that, although FIG. 6 illustrates a case where these three field periods are arranged in the order of red field period TFR, green field period TFG and blue field period TFB, these three field periods may be arranged in a different order.

In the display operation of the present embodiment, unlike the display operation shown in FIG. 5, the red field period TFR includes a clear period TCR in addition to a scanning period TSR and a holding period THR. The respective periods TSR, THR and TCR will be described in order.

The scanning period TSR includes n horizontal scanning periods THSR1 to THSRn and is, for example, 2.5 ms. In this scanning period TSR, the gate driver GD1 and GD2 supply a scanning signal to the scanning lines G1 to Gn sequentially. In the display operation of the present embodiment, the scanning period TSR is not limited to the above value but only has to be less than or equal to 5 ms. Furthermore, during the supply of the scanning signal, the source driver SD supplies a voltage corresponding to a red image component to the signal lines S1 to Sm. According to this, the voltage corresponding to the red image component is written between the pixel electrode 11 of each pixel PX and the common electrode 21.

Unlike the display operation of FIG. 5, the red light-emitting element LSR starts to light in the scanning period TSR. According to this, in the display area DA, an image corresponding to the red image component starts to be displayed in order from a pixel PX portion in which the red image component is written. In the example of FIG. 6, a case where the red light-emitting element LSR starts to light at the same timing as the horizontal scanning period THSR1. However, the timing when the red light-emitting element LSR start to light may be any timing within the scanning period TSR. Note that, as will be described later in detail, it is preferable that the timing when the red light-emitting element LSR starts to light should be as early as possible.

The holding period THR is a period from the completion of the writing of the red image component to all the pixels PX (in order words, from the end of the scanning period TSR) to the arrival of the clear period TCR and is, for example, 2 ms. Also in the holding period THR, the red light-emitting element LSR continues to maintain the lighting state.

The clear period TCR is a period from the completion of the display of the red image corresponding to the red image component (in order words, from the end of the holding period THR) to the arrival of the green field period TFG and is, for example, 0.5 ms. In the clear period TCR, the gate drivers GD1 and GD2 supply a scanning signal to the scanning lines G1 to Gn simultaneously. In this case, in the clear period TCR, an n-times higher current load is applied as compared with when a scanning signal is supplied to the scanning lines C1 to Gn sequentially. For this reason, it is preferable that the clear period TCR should be longer than one horizontal scanning period for supplying a scanning signal to one scanning line. Note that, although FIG. 6 illuminates a case where the scanning signal is supplied to the scanning lines G1 to Gn simultaneously in the clear period TCR, the scanning signal may be supplied to the scanning lines G1 to Gn sequentially. In the clear period TCR, during the supply of the scanning signal, the source driver SD supplies a voltage (transparent voltage) equivalent to the common voltage to the signal lines S1 to Sm. According to this, the transparent voltage is written between the pixel electrodes 11 of all the pixels PX and the common electrode 21, and the red image component written in each pixel PX is erased. After the scanning signal is supplied to the scanning lines G1 to Gn simultaneously, the pixel electrode 11 of each pixel PX becomes floating until a scanning signal is supplied to the corresponding scanning line G next. Therefore, in the pixel PX in which the transparent voltage is written, the transparent voltage is held until the next scanning signal is supplied to the corresponding scanning line G.

In the clear period TCR, the red light-emitting element LSR is turned off. That is, the lighting period of the red light-emitting element LSR corresponds to a period from the start of the scanning period TSR to the end of the holding period THR or a period from the middle of the scanning period TSR to the end of the holding period THR. It is preferable, from the perspective of power saving, that the red light-emitting element LSR should be turned off in the clear period TCR. However, even if the red light-emitting element LSR is still on in the clear period TCR, there is no problem in display operation.

The operation in the green field period TFG and the operation in the blue field period TFB are the same as that in the red field period TFR. That is, the green field period TFG includes a scanning period TSG, a holding period THG and a clear period TCG. In the scanning period TSG, a voltage (scattering voltage) corresponding to a green image component is written to each pixel PX, and the green light-emitting element LSG is turned on. In the holding period THG, the lighting state of the green light-emitting element LSG is maintained. In the clear period TCG, a voltage (transparent voltage) equivalent to the common voltage is written to each pixel PX so that the green image component is erased, and the green light-emitting element LSG is turned off. In addition, the blue field period TFB includes a scanning period TSB, a holding period THB and a clear period TCB. In the scanning period TSB, a voltage (scattering voltage) corresponding to a blue image component is written to each pixel PX, and the blue light-emitting element LSB is turned on. In the holding period THB, the lighting state of the blue light-emitting element LSB is maintained. In the clear period TCB, a voltage (transparent voltage) equivalent to the common voltage is written to each pixel PX so that the blue image component is erased, and the blue light-emitting element LSB is turned off.

In the display operation of the present embodiment, as shown in FIG. 6, a case where there is a small blacking period between the clear period and the next field period is illustrated. However, this blanking period may be omitted. In addition, in the display operation of the present embodiment, a case where the respective periods included in each of the field periods TFR, TFG and TFB are arranged in the order of scanning period, holding period and clear period is illustrated. However, the present invention is not limited to this, but the respective periods may be arranged in the order of clear period, scanning period and holding period. In short, the clear period only has to be positioned before an image component of a color different from that of an image component of a color corresponding to the previous or next field period is written to the pixel PX.

DAR1 to DAR6, DAG1 to DAG6 and DAB1 to DAB6 of FIG. 6 will be described later in detail.

According to the display operation of the present embodiment described above, the following effect can be obtained.

Figure 7:
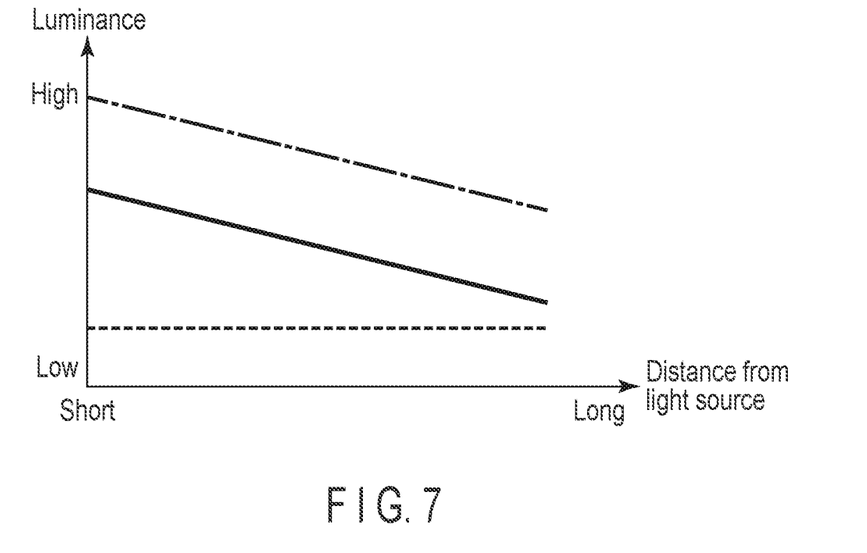
FIG. 7 is a graph showing the correlation between the luminance of a pixel and the distance from a light-emitting element to the pixel corresponding to the display operation of FIG. 5.

FIG. 7 is an illustration showing the correlation between the luminance of each pixel PX and the distance from the light-emitting element LS to each pixel PX when the general display operation shown in FIG. 5 is performed. The vertical axis of FIG. 7 shows the luminance of each pixel PX, and the horizontal axis shown the distance from the light-emitting element LS to each pixel PX.

A dashed-dotted line of FIG. 7 shows a change of the intensity of the illumination light emitted from the light-emitting element LS, and shows that the intensity of the illumination light is attenuated significantly as the distance from the light-emitting element LS increases as described above. A dotted line of FIG. 7 shows the integral value of a time during which each pixel PX is in the scattering state and the light-emitting element LS is on (in other words, the integral value of a time during which each pixel PX holds the voltage corresponding to the image component and the illumination light enters each pixel PX). In the general display operation shown in FIG. 5, after the writing of the image component to all the pixels PX is completed, the light-emitting element LS is turned on. Therefore, the integral value of the time during which each pixel PX is in the scatting state becomes constant regardless of the distance from the light-emitting element LS.

A solid line of FIG. 7 shows the correlation between the luminance of each pixel PX and the distance from the light-emitting element LS to each pixel PX. In short, the solid line of FIG. 7 shows how each pixel PX looks to the observer. While the intensity of the luminance light is attenuated as the distance from the light-emitting element LS increases as shown by the dashed-dotted line of FIG. 7, the integral value of the time during which each pixel PX is in the scattering state is constant as shown by the solid line of FIG. 7. Therefore, as shown in the solid line of FIG. 7, the luminance of the pixel PX located close to the light-emitting element LS becomes high, and the luminance of the pixel PX located far from the light-emitting element LS becomes low. That is, a large luminance gradient occurs in the same display plane, and the observer visually recognizes an image displayed at a position close to the light-emitting element LS as bright, and visually recognizes an image displayed at a position far from the light-emitting element LS as dark.

Figure 8:
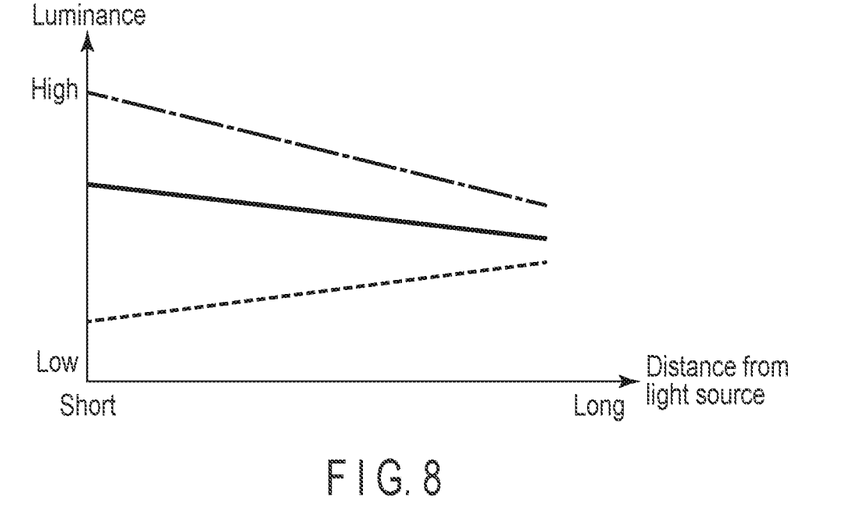
FIG. 8 is a graph showing the correlation between the luminance of the pixel and the distance from the light-emitting element to the pixel corresponding to the display operation of FIG. 6.

On the other hand, FIG. 8 is an illustration showing the correlation between the luminance of each pixel PX and the distance from the light-emitting element LS to each pixel PX when the display operation of the present embodiment shown in FIG. 6 is performed. Just like FIG. 7, the vertical axis of FIG. 8 shows the luminance of each pixel PX, and the horizontal axis shows the distance from the light-emitting element LS to each pixel PX.

A dashed-dotted line of FIG. 8 shows a change of the intensity of the luminance light emitted from the light-emitting element LS, and shows the same change as that of FIG. 7. Just like FIG. 7, a dotted line of FIG. 8 shows the integral value of a time during which each pixel PX is in the scattering state. In the display operation of the present embodiment, as described with reference to FIG. 6, when the scanning period TS starts and the image component starts to be written to each pixel PX in order from the pixel PX located on the opposite side to the light-emitting element LS, the light-emitting element LS is turned on. Therefore, the pixel PX located on the opposite side to the light-emitting element LS has a long time of the scattering state, and the pixel PX located close to the light-emitting element LS has a short time of the scattering state. That is, the pixel PX located farther from the light-emitting element LS has a longer time of the scattering state, and the pixel PX located closer to the light-emitting element LS has a shorter time of the scattering state.

Just like FIG. 7, a solid line of FIG. 8 shows the correlation between the luminance of each pixel PX and the distance from the light-emitting element LS to each pixel PX. As shown by a dashed-dotted line of FIG. 8, the intensity of the luminance light is attenuated as the distance from the light-emitting element LS increases. However, as shown by a dotted line of FIG. 8, the integral value of the time during which each pixel PX is in the scattering state increases as the pixel PX is located farther from the light-emitting element LS, and decreases as the pixel PX is located closer to the light-emitting element. Therefore, as shown by a solid line of FIG. 8, the luminance of the pixel PX located farther from the light-emitting element LS becomes higher than that of FIG. 7, and the luminance of the pixel PX located closer to the light-emitting element LS becomes slightly lower than that of FIG. 7 but becomes sufficiently high since the illumination light hardly attenuated from the time of emission enters the pixel PX located close to the light-emitting element LS. According to this, as shown in FIG. 8, the luminance gradient occurring in the same display plane can be made smaller (gentler) than that of FIG. 7. Consequently, the observer can visually recognize both the image displayed at the position close to the light-emitting element Ls and the image displayed at the position far from the light-emitting element LS as bright.

In addition, the following effect can also be obtained.

In the case of the general display operation, after the writing of the image component to all the pixels PX is completed, the light-emitting element LS is turned on. Therefore, the illumination light emitted from the light-emitting element LS may be attenuated not only due to the characteristics of light but also due to the obstruction by the pixel PX in the scattering state located close to the light-emitting element LS. However, in the case of the display operation of the present embodiment, when the image component starts to be written to each pixel PX, the light-emitting element LS is turned on. Therefore, the illumination light without the attenuation due to the obstruction can also enter the pixel PX located far from the light-emitting element LS until the image component is written to the pixel PX located closer to the light-emitting element LS than the pixel PX.

Furthermore, the display operation of the present embodiment can be realized by changing the output timing of the control signal output from the timing controller TC to the gate drivers GD1 and GD2, the source driver SD, the Vcom circuit VC and the light source driver LSD, and it is not necessary to add a new circuit or add signal processing to image data.

DAR1 to DAR6, DAG1 to DAG6 and DAB1 to DAB6 of FIG. 6 specifically show the effects of the display operation of the present embodiment.

DAR1 to DAR4 of FIG. 6 schematically show the state of the display area DA in the times TR1 to TR4 included in the scanning period TSR, and shows the state where the voltage corresponding to the red image component is written in order from the pixel PX located on the opposite side to the light-emitting element LS and the red light-emitting element LSR is turned on. When DAR1 and DAR4 of FIG. 6 are compared with each other, the luminance of the pixel PX located on the opposite side of the light-emitting element LS increases with time. This is the effect obtained by increasing the time of the scattering state. DAR5 of FIG. 6 schematically shows the state of the display area DA in the time TR5 included in the holding period THR, and the red light-emitting element LSR continues to light from the scanning period TSR. Since the time during which each pixel PX is in the scattering state is equally longer by the difference between the time TR5 and the time TR4, as shown in DAR5 of FIG. 6, the luminance of each pixel PX is higher than that of DAR4 of FIG. 6. DAR6 of FIG. 6 schematically shows the state of the display area DA in the time TR6 included in the clear period TCR, and shows the state where the red image component is erased from each pixel PX and the red light-emitting element LSR is turned off. According to this, even if the green image component is written and the green light-emitting element LSG is turned on in the scanning period TSG included in the green field period TFG, since the red image component is already erased from each pixel PX, the occurrence of color mixing described above can be suppressed.

Similarly, DAG1 to DAG4 of FIG. 6 schematically shows the state of the display area DA in the times TG1 to TG4 included in the scanning period TSG, and shows the state where the voltage corresponding to the green image component is written in order from the pixel PX located on the opposite side to the light-emitting element LS and the green light-emitting element LSG is turned on. DAG5 of FIG. 6 schematically shows the state of the display area DA in the time TG5 included in the holding period THG, and the green light-emitting element LSG continues to light from the scanning period TSG. DAG6 of FIG. 6 schematically shows the state of the display area DA in the time TG6 included in the clear period TCG, and shows the state where the green image component is erased from each pixel PX and the green light-emitting element LSG is turned off.

Furthermore, DAB1 to DAB4 of FIG. 6 schematically show the state of the display area DA in the times TB1 to TB4 included in the scanning period TSB, and shows the state where the voltage corresponding to the blue image component is written in order from the pixel PX located on the opposite side to the light-emitting element LS and the blue light-emitting element LSB is turned on. DAB5 of FIG. 6 schematically shows the state of the display area DA in the time TB5 included in the holding period THB, and the blue light-emitting element LSB continues to light from the scanning period TSB. DAB6 of FIG. 6 schematically shows the state of the display area DA in the time TB6 included in the clear period TCB, and shows the state where the blue image component is erased from each pixel PX and the blue light-emitting element LSB is turned off.

According to one embodiment described above, the display quality of the display device comprising the polymer dispersed liquid crystal layer can be improved.

The time when the scanning signal is supplied to the scanning lines G1 to Gn sequentially and the voltage corresponding to the image component is written to the signals S1 to Sm changes depending on the response speed of the liquid crystal molecules contained in the liquid crystal layer LC, and does not change between the display operation of FIG. 5 and the display operation of FIG. 6. Therefore, in the display operation of the present embodiment, the holding period and the clear period have the relationship that, as the holding period increases, that the clear period decreases, and as the clear period increases, the holding period decreases.

When the clear period is increased and the holding period is reduced, as described above, the integral value of the time during which each pixel PX is in the scattering state can be increased as the pixel PX is located farther from the light-emitting element LS and can be reduced as the pixel PX is located closer to the light-emitting element LS. That is, the gradient of the integral value of the time during which the pixel is in the scattering state (the gradient of the dotted line of FIG. 8) can be made larger (sharper), and as a result, the luminance gradient (the gradient of the solid line of FIG. 8) can be made smaller (gentler). However, since the holding period is short, the display period of an image corresponding to an image component written at a time close to the end of the scanning period becomes short, and the image corresponding to the image component written close to the end of the scanning period may not be displayed properly.

When the clear period is reduced and the holding period is increased, the display period of the image corresponding to the image component written close to the end of the scanning period can made longer than that when the clear period is increased, and the image corresponding to the image component written close to the end of the scanning period can be displayed properly. However, the gradient of the integral value of the time during which each pixel PX is in the scattering state becomes smaller than that when the clear period is increased, and as a result, the luminance gradient becomes larger than that when the clear period is increased, and consequently, the luminance gradient in the same plane may become, though slightly, non-uniform. In addition, when the clear period is short, the image component written in each pixel PX may not be sufficiently erased.

In consideration of the relationship described above, the holding period and the clear period are set to preferable values. Furthermore, the values of the holding period and the clear period may be arbitrarily changed.

In the present embodiment, the display operation is described by taking the field-sequential method as an example. However, the display operation can also be applied to a case where a single light source color is used as a matter of course.

All display devices implementable by a person of ordinary skill in the art through arbitrary design changes to the display device described above as the embodiment of the present invention come within the scope of the present invention as long as they are in keeping with the spirit of the present invention.

Various modifications are easily conceivable within the category of the ideas of the present invention by a person of ordinary skill in the art, and these modifications are also considered to fall within the scope of the present invention. For example, additions, deletions or changes in design of the components or additions, omissions, or changes in condition of the processes arbitrarily conducted by a person of ordinary skill in the art, in the above embodiment, fall within the scope of the present invention as long as they are in keeping with the spirit of the present invention.

In addition, the other advantages of the aspects described in the embodiment, which are obvious from the descriptions of the present specification or which can be arbitrarily conceived by a person of ordinary skill in the art, are considered to be achievable by the present invention as a matter of course.

What is claimed is:

1. A display device comprising:
a display panel comprising a plurality of pixels arranged in a matrix, a common electrode, a pixel electrode disposed for each of the pixels, and a liquid crystal layer containing a polymer and liquid crystal molecules;
a light source emitting light to the display panel; and
a controller controlling a voltage between the common electrode and the pixel electrode, and controlling an operation of the light source, wherein
the controller applies a voltage corresponding to an image component to write the image component between the common electrode and the pixel electrode in order from the pixel located on an opposite side to the light source in a first period,
the controller turns on the light source to display an image corresponding to the written image component on the display panel in the first period,
the controller applies a transparent voltage for erasing the image component written in the pixel between the common electrode and the pixel electrode in a second period before the controller applies the voltage corresponding to the image component between the common electrode and the pixel electrode,
the controller turns off the light source in the second period,
the controller maintains the light source on in a third period following the first period to display one image composed of the image components written in the pixels on the display panel when writing of the image component to the pixels is completed and the first period ends,
a frame period in which the one image is displayed includes the first to third periods,
the light source includes a first light-emitting element emitting light of a first color, and a second light-emitting element emitting light of a second color,
the frame period includes a first field period having the first to third periods corresponding to the first color, and a second field period having the first to third periods corresponding to the second color and following the first field period,
in the first period included in the first field period, the controller applies the voltage corresponding to the image component of the first color to write the image component of the first color to the pixels, and turns on the first light-emitting element when the image component of the first color starts to be written to the pixels in order from the pixel located on an opposite side to the light source, in the first period included in the second field period, the controller applies the voltage corresponding to the image component of the second color to write the image component of the second color to the pixels, and turns on the second light-emitting element when the image component of the second color starts to be written to the pixels in order from the pixel located on the opposite side to the light source, and the controller applies the transparent voltage to erase the image components of the first color written in the pixels before the controller writes the image component of the second color to the pixels in the first period of the second field period.

2. The display device of claim 1, wherein the transparent voltage is a common voltage.

3. The display device of claim 1, wherein the controller applies the transparent voltage between the common electrode and the pixel electrodes simultaneously to erase the image components written in the pixels simultaneously in the second period.

4. The display device of claim 1, wherein the frame period includes the first to third periods in order of first period, third period and second period.

5. The display device of claim 1, wherein the frame period includes the first to third periods in order of second period, first period and third period.

6. The display device of claim 1, wherein the second period is longer than a time during which the image component is written to one pixel of the pixels in the first period.

7. A control method for a display device comprising a display panel including a plurality of pixels arranged in a matrix, a common electrode, a pixel electrode disposed for each of the pixels, and a liquid crystal layer containing a polymer and liquid crystal molecules, a light source emitting light to the display panel, and a controller controlling a voltage between the common electrode and the pixel electrode and controlling an operation of the light source, the control method comprising:

applying a voltage corresponding to an image component to write the image component between the common electrode and the pixel electrode in order from the pixel located on an opposite side to the light source in a first period;

turning on the light source to display an image corresponding to the written image component on the display panel in the first period;

applying a transparent voltage for erasing the image component written in the pixel between the common electrode and the pixel electrode in a second period before applying the voltage corresponding to the image component between the common voltage and the pixel electrode;

turning off the light source in the second period; and maintaining the light source on in a third period following the first period to display one image composed of the image components written in the pixels when writing of the image component to the pixels is completed and the first period ends; wherein a frame period in which the one image is displayed includes the first to third periods, the light source includes a first light-emitting element emitting light of a first color, and a second light-emitting element emitting light of a second color, and the frame period includes a first field period having the first to third periods corresponding to the first color, and a second field period having the first to third periods corresponding to the second color and following the first field period, the control method for the display device, further comprising:

in the first period included in the first field period, applying the voltage corresponding to the image component of the first color to write the image component of the first color to the pixels, and turning on the first light-emitting element when the image component of the first color starts to be written to the pixels in order from the pixel located on an opposite side to the light source;

in the first period included in the second field period, applying the voltage corresponding to the image component of the second color to write the image component of the second color to the pixels, and turning on the second light-emitting element when the image component of the second color starts to be written to the pixels in order from the pixel located on the opposite side to the light source; and applying the transparent voltage to erase the image components of the first color written in the pixels before writing the image component of the second color to the pixels in the first period of the second field period.

8. The control method for the display device of claim 7, wherein the transparent voltage is a common voltage.

9. The control method for the display device of claim 7, further comprising applying the transparent voltage between the common electrode and the pixel electrodes simultaneously to erase the image components written in the pixels simultaneously in the second period.

10. The display device of claim 7, wherein the frame period includes the first to third periods in order of first period, third period and second period.

11. The display device of claim 7, wherein the frame period includes the first to third periods in order of second period, first period and third period.

12. The control method for the display device of claim 7, wherein the second period is longer than a time during which the image component is written to one pixel of the pixels in the first period.

* * * * *